United States Patent
Argumedo et al.

(10) Patent No.: US 10,672,431 B2
(45) Date of Patent: Jun. 2, 2020

(54) DAMPING LAYERS FOR MITIGATION OF MOTOR-INDUCED DISTURBANCES APPLIED TO A TAPE REEL

(71) Applicant: International Business Machines Corporation, Armonk, NY (US)

(72) Inventors: Armando Argumedo, Tucson, AZ (US); Kevin B. Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/156,977

(22) Filed: Oct. 10, 2018

(65) Prior Publication Data
US 2020/0118600 A1 Apr. 16, 2020

(51) Int. Cl.
G11B 33/14 (2006.01)

(52) U.S. Cl.
CPC ........ G11B 33/148 (2013.01); G11B 2220/90 (2013.01)

(58) Field of Classification Search
CPC ................... G11B 33/148; G11B 2220/90
USPC .......................................................... 360/90
See application file for complete search history.

(56) References Cited

U.S. PATENT DOCUMENTS

| | | | |
|---|---|---|---|
| 3,925,820 A * | 12/1975 | Esashi | G11B 15/6655 242/326.4 |
| 4,825,317 A | 4/1989 | Rausch | |
| 5,739,984 A | 4/1998 | Eckberg | |
| 6,768,604 B2 | 7/2004 | Anderson | |
| 6,863,629 B2 | 3/2005 | Falone et al. | |
| 7,230,788 B2 | 6/2007 | Goker et al. | |
| 7,295,402 B2 | 11/2007 | Okawa et al. | |
| 7,940,490 B2 | 5/2011 | Shelor | |
| 8,982,493 B2 | 3/2015 | Underkofler | |
| 9,047,900 B2 | 6/2015 | Goker et al. | |
| 9,685,189 B1 * | 6/2017 | Harper | G11B 15/32 |
| 2002/0191321 A1 | 12/2002 | Anderson | |
| 2005/0092859 A1 * | 5/2005 | Aaron | G11B 23/043 242/338.1 |
| 2006/0098328 A1 | 5/2006 | Goker et al. | |
| 2006/0151651 A1 * | 7/2006 | Stamm | G11B 23/107 242/348 |

(Continued)

FOREIGN PATENT DOCUMENTS

EP 0881626 A1 12/1998

OTHER PUBLICATIONS

Raeymaekers et al., "Measurement and Sources of Lateral Tape Motion: A Review," Journal of Tribology, ASME, Jan. 2009, vol. 131, pp. 011903-1-011903-6.

*Primary Examiner* — Allen T Cao
(74) *Attorney, Agent, or Firm* — Zilka-Kotab, P.C.

(57) ABSTRACT

An apparatus according to one embodiment includes a reel having a hub, and a damping layer coupled to the reel for translating motion of a motor to the reel. The damping layer is physically configured to dampen motor-induced motion of the reel along an axis of rotation of the reel. An apparatus according to another embodiment includes a reel having a hub, and a damping layer coupled to the reel for translating motion of a motor to the reel. The damping layer includes a laminate having a first metal layer and a viscoelastic layer extending along the first metal layer for dampening motor-induced motion of the reel along an axis of rotation of the reel.

20 Claims, 15 Drawing Sheets

(56) References Cited

U.S. PATENT DOCUMENTS

2009/0268326 A1 10/2009 Shelor
2014/0355153 A1 12/2014 Goker et al.
2014/0376126 A1 12/2014 Underkofler \* cited by examiner

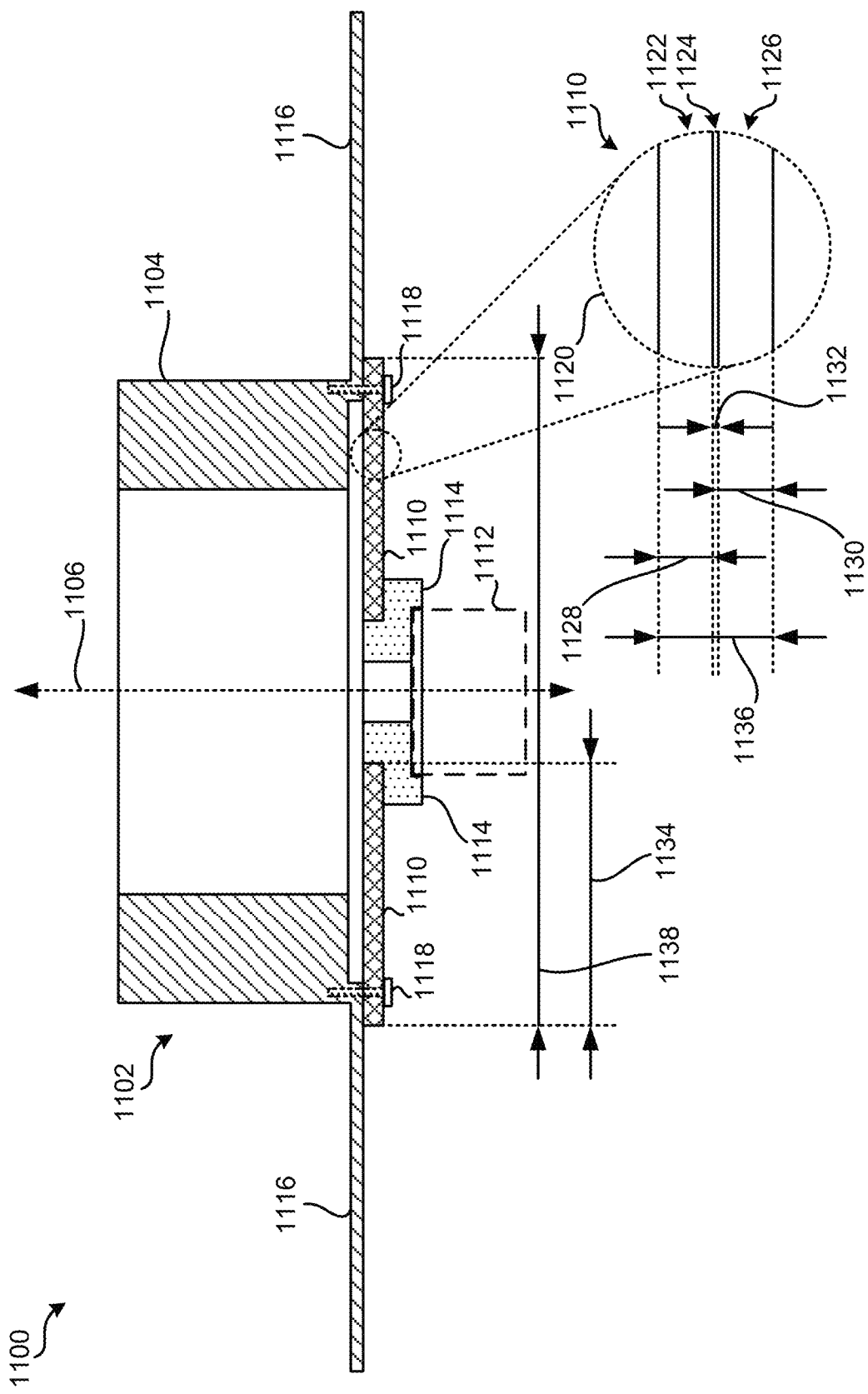

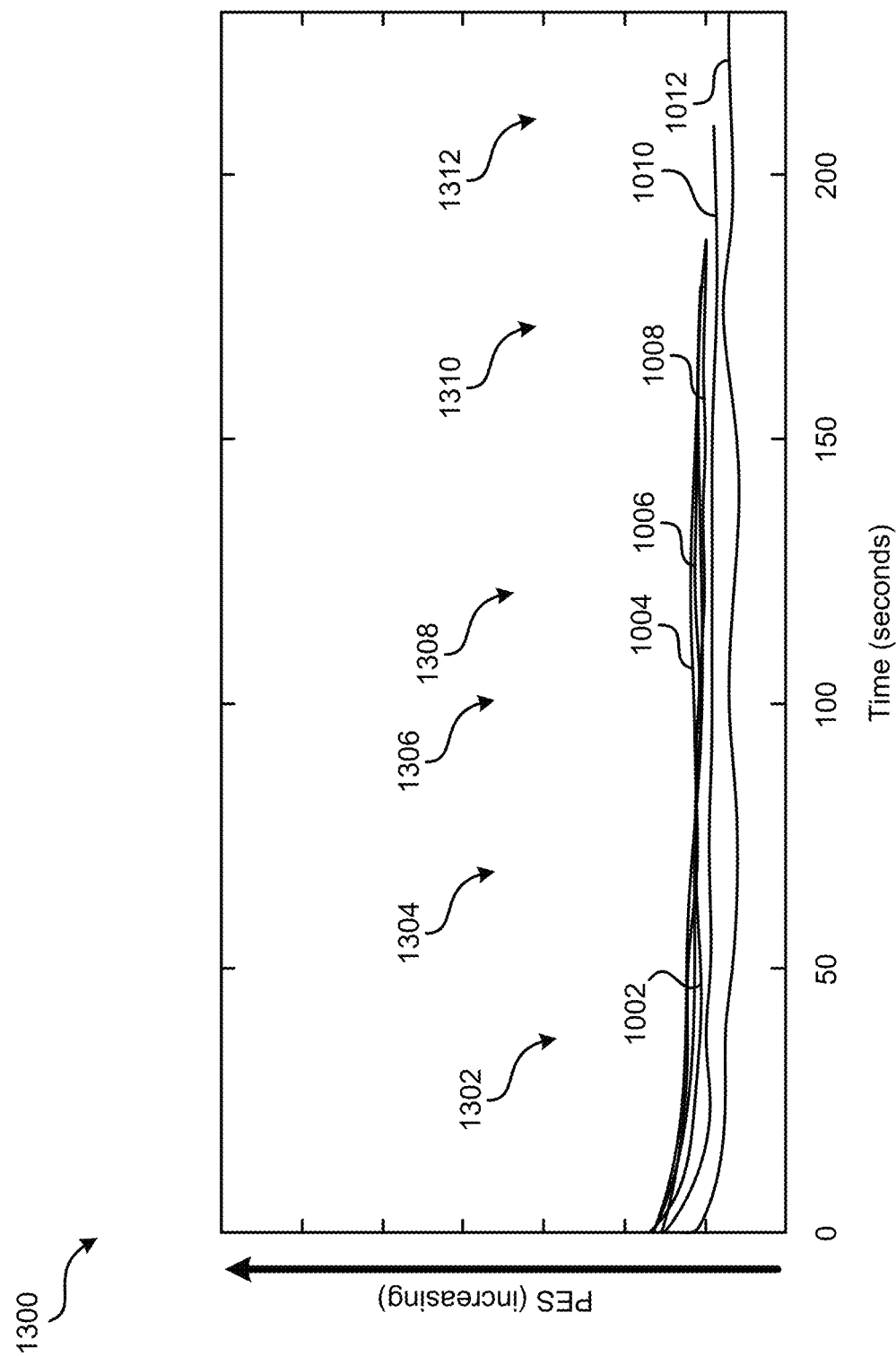

DAMPING LAYERS FOR MITIGATION OF MOTOR-INDUCED DISTURBANCES APPLIED TO A TAPE REEL

BACKGROUND

The present invention relates to data storage systems, and more particularly, this invention relates to mitigation of motor-induced disturbances applied to a tape reel.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the recording tape medium. However, the development of small footprint, higher performance tape drive systems has created various problems in the design of a tape head assembly for use in such systems.

In a tape drive system, the drive moves the recording tape over the surface of the tape head at high speed. Usually the tape head is designed to minimize the spacing between the head and the tape. The spacing between the magnetic head and the recording tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

For modern tape drive design, and magnetic recording tape design, it is useful to achieve as high of a storage capacity as physically possible. One way to achieve a relatively high storage capacity is via increasing track density, e.g., by writing narrower tracks. One way to enable use of a relatively higher track density is by improving (decreasing) the position error signal (PES) during writing, which is a measure of how far the actual tape head position is from a known position relative to the tape, and is typically provided by a track following system such as a timing-based servo track following system. Thus, the accuracy of PES-based positioning is reflected in the written tracks, and therefore PES errors cause the actual track placement to be offset from the desired track placement. Various mechanical and/or servo related efforts have been used in the past, attempting to improve PES within tape drives; however, the demand for increased storage capacities remains ongoing.

One source of PES-related problems in tape drive environments is disturbances originating from the reels and/or motors coupled to such reels. These disturbances can originate from events including (but not limited to) run-out, impacts of the tape and the reel flanges, electromechanical disturbances from the commutation of the reel motor itself, etc. One strategy that has been undertaken to mitigate the negative effects associated with these disturbances includes designing a variable frequency notch filter that can track the time-varying frequency of the reel motor. However, this strategy can cause increased error amplifications at other frequencies due to Bode's integral theorem.

SUMMARY

An apparatus according to one embodiment includes a reel having a hub, and a damping layer coupled to the reel for translating motion of a motor to the reel. The damping layer is physically configured to dampen motor-induced motion of the reel along an axis of rotation of the reel. For example, in preferred approaches, the damping layer preferably exists between the reel and the motor. Accordingly, the damping layer substantially decouples a source of disturbance from the reel and/or a recording tape associated with the reel by absorbing and thereby mitigating forces from reaching the reel, where such forces would otherwise result in PES. More specifically, such absorption by the damping layer mitigates certain natural frequencies of the motor from causing increases in PES, e.g., such as increases in PES characterized by spikes.

As briefly noted above, this mitigation of forces from reaching the reel reduces the amount of motor-induced PES variation within a tape storage system that is utilizing and/or incorporates the apparatus. As a result, the apparatus thereby enables a relatively higher track density (e.g., on a recording tape of the tape storage system) than would otherwise be available without such a damping layer.

An apparatus according to another embodiment includes a reel having a hub, and a damping layer coupled to the reel for translating motion of a motor to the reel. The damping layer includes a laminate having a first metal layer and a viscoelastic layer extending along the first metal layer for dampening motor-induced motion of the reel along an axis of rotation of the reel. For example, in preferred approaches, the damping layer preferably exists between the reel and the motor. Accordingly, the damping layer substantially decouples a source of disturbance from the reel and/or a recording tape associated with the reel by absorbing and thereby mitigating forces from reaching portions of the apparatus that would otherwise result in PES. More specifically, such absorption by the damping layer mitigates certain natural frequencies of the motor from causing increases in PES, e.g., such as increases in PES characterized by spikes.

As briefly noted above, this mitigation of forces from reaching the reel reduces the amount of motor-induced PES variation within a tape storage system that is utilizing and/or incorporates the apparatus. As a result, the apparatus thereby enables a relatively higher track density (e.g., on a recording tape of the tape storage system) than would otherwise be available without such a damping layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 11B is a cross sectional view of the apparatus of FIG. 11A taken along line 11B-11B.

FIG. 13 is a graph comparing PES levels recorded over time at different reel motor speeds.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of apparatuses having at least one damping layer for mitigating PES related forces in a tape drive, as well as operation and/or component parts thereof.

In one general embodiment, an apparatus includes a reel having a hub, and a damping layer coupled to the reel for translating motion of a motor to the reel. The damping layer is physically configured to dampen motor-induced motion of the reel along an axis of rotation of the reel.

In another general embodiment, an apparatus includes a reel having a hub, and a damping layer coupled to the reel for translating motion of a motor to the reel. The damping layer includes a laminate having a first metal layer and a viscoelastic layer extending along the first metal layer for dampening motor-induced motion of the reel along an axis of rotation of the reel.

Figure 1A:
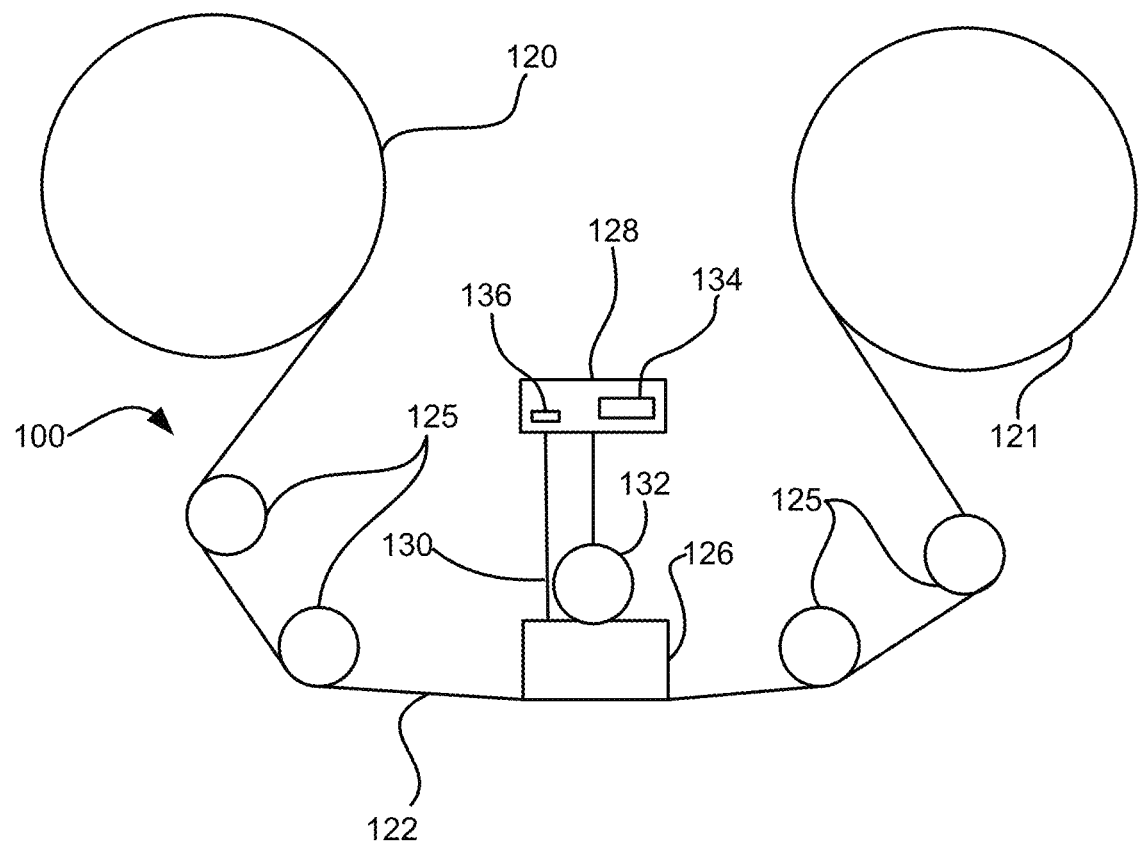
FIG. 1A is a schematic diagram of a simplified tape drive system.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
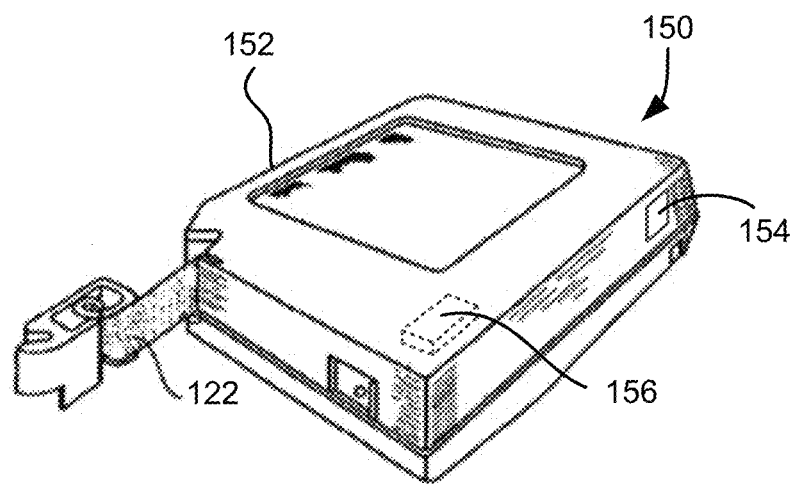
FIG. 1B is a schematic diagram of a tape cartridge.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
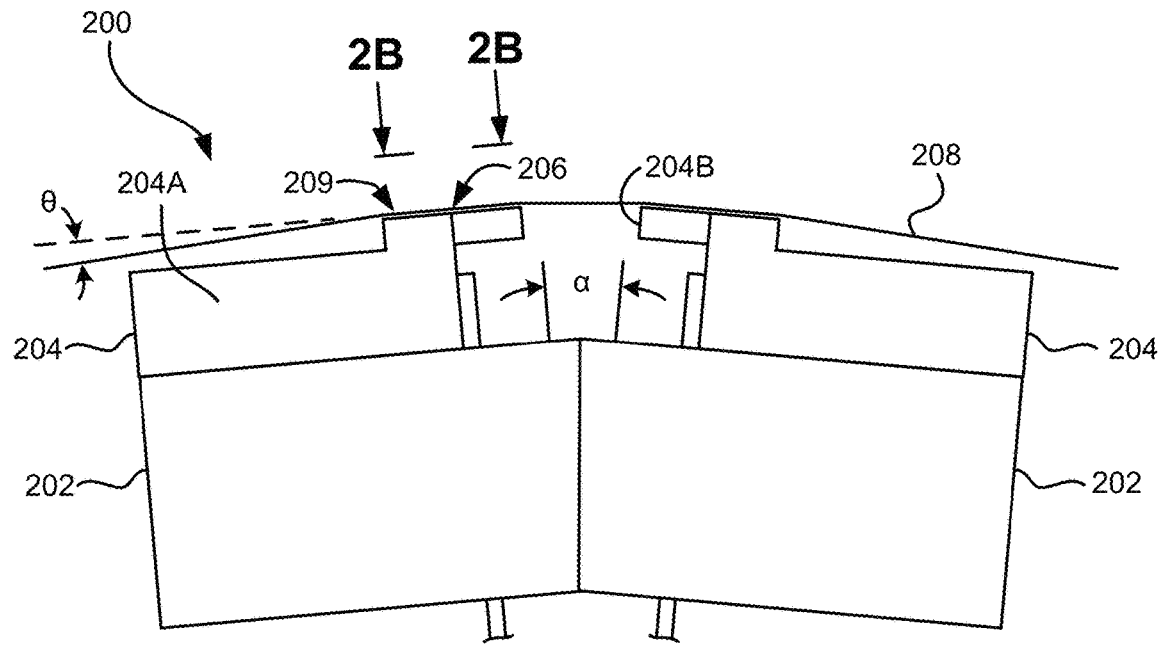
FIG. 2A illustrates a side view of a flat-lapped, bi-directional, two-module magnetic tape head.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
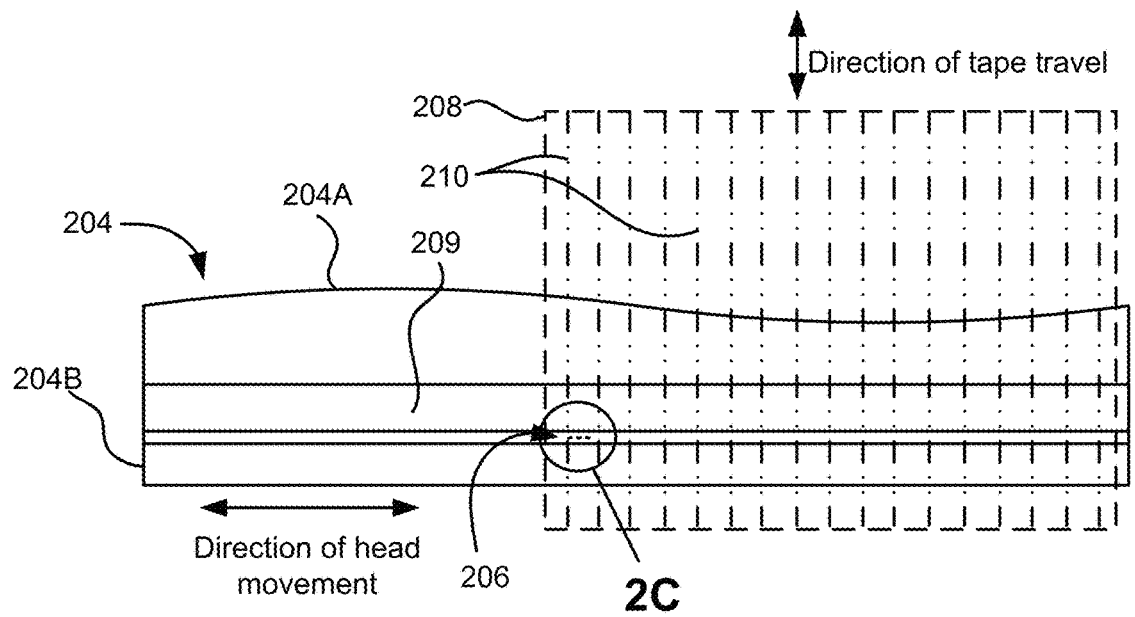
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
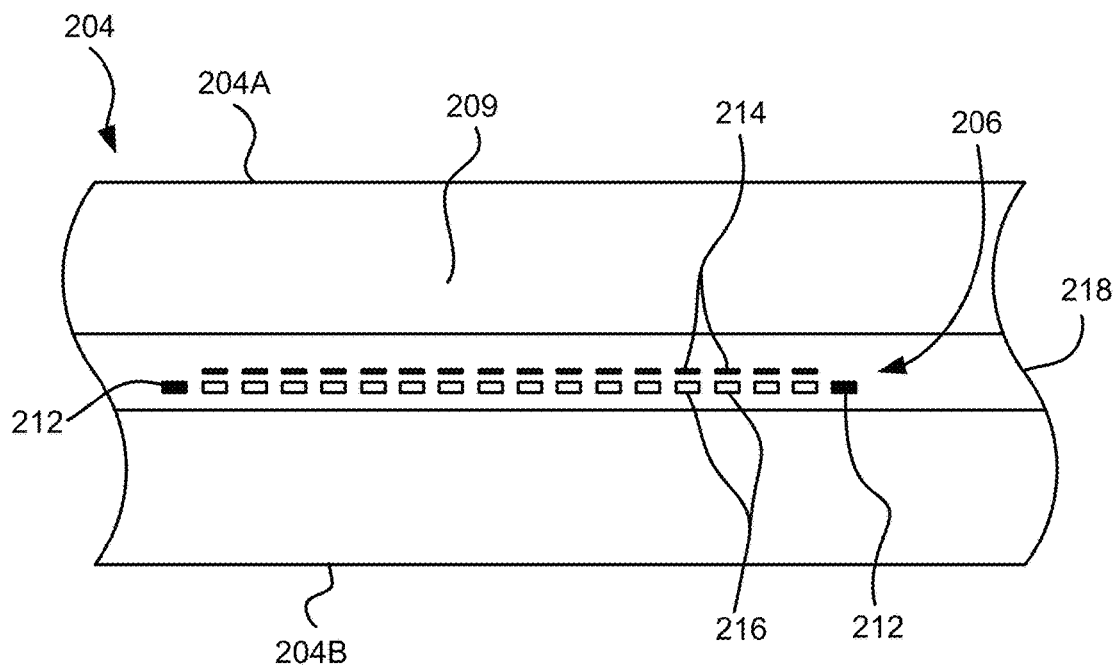
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
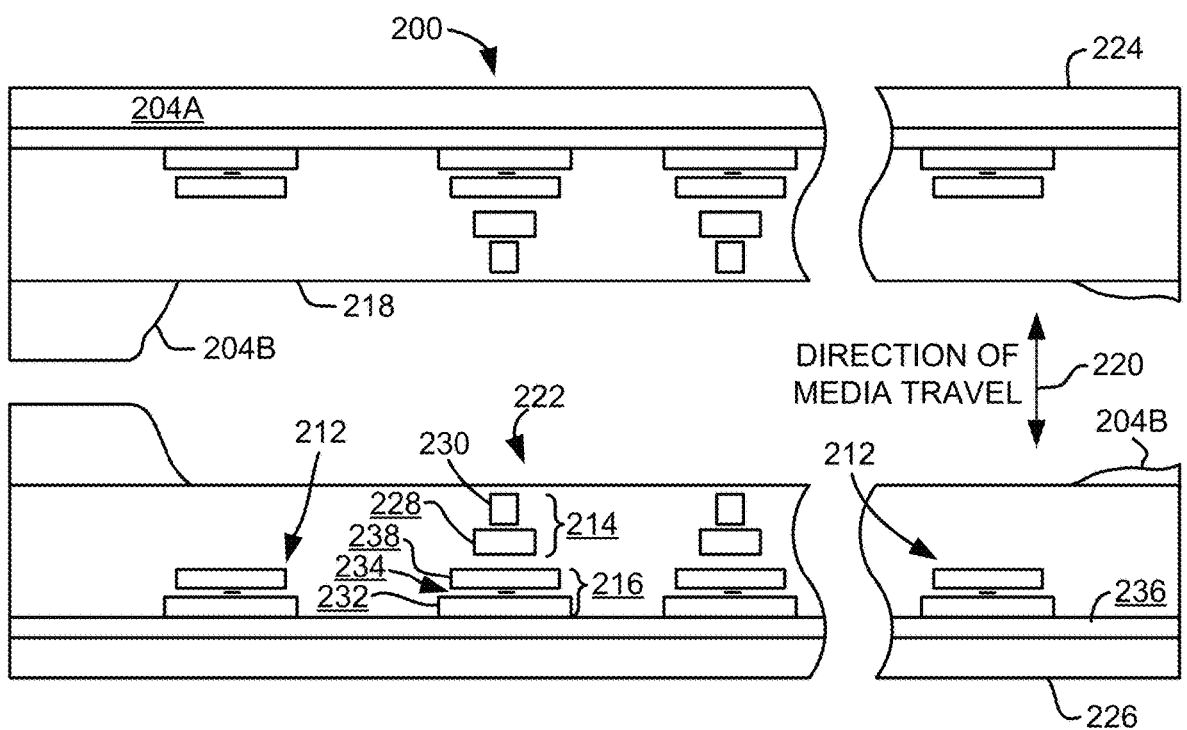
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
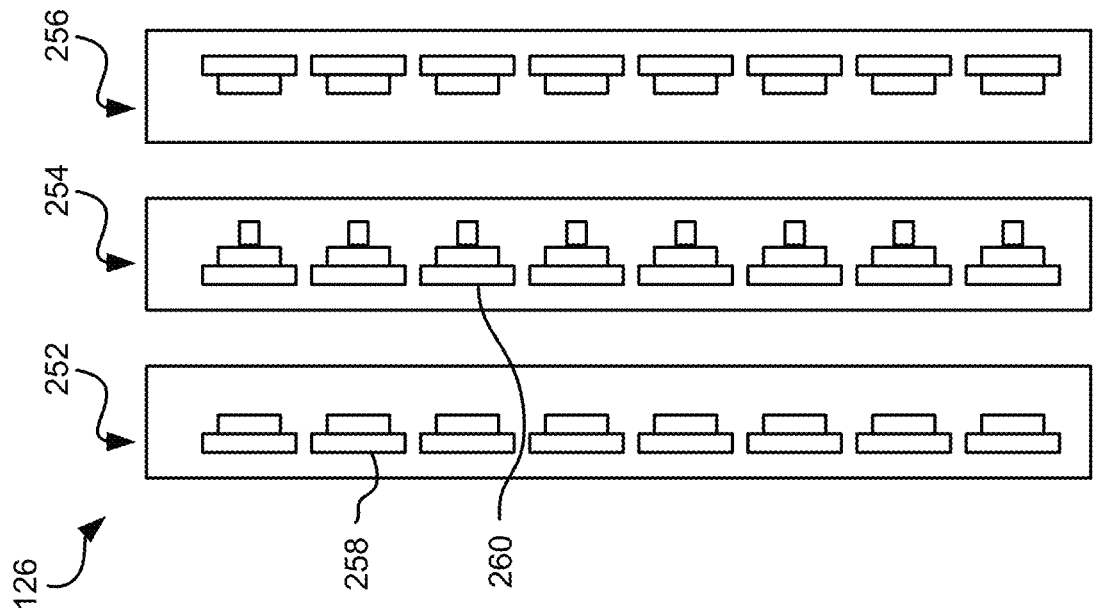
FIG. 4 is a partial tape bearing surface view of a magnetic head having a read-write-read configuration.
Figure 3:
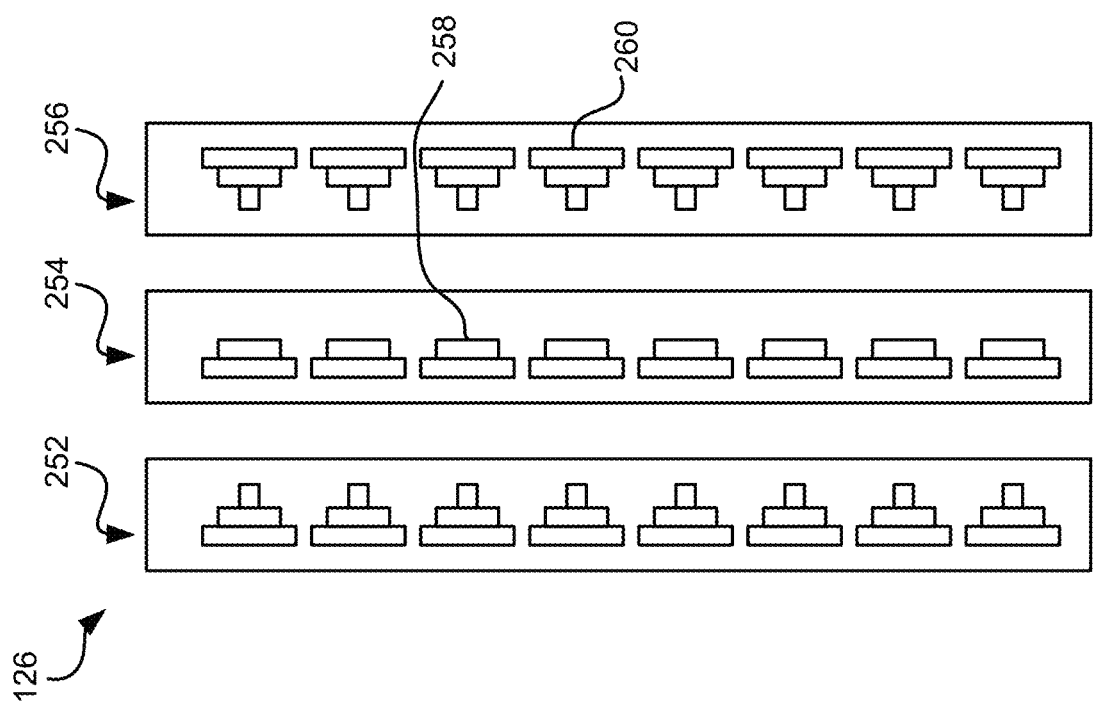
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
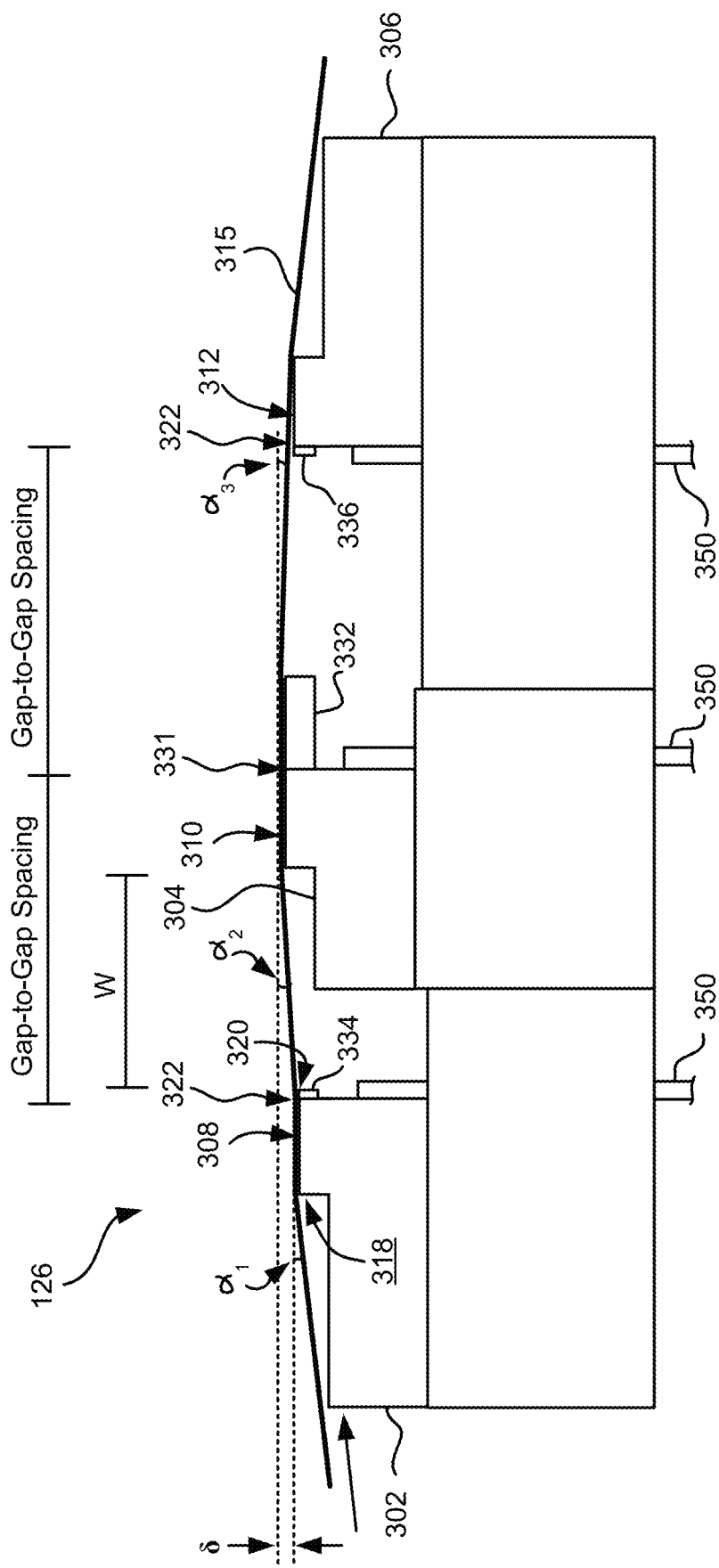
FIG. 5 is a side view of a magnetic tape head with three modules, where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
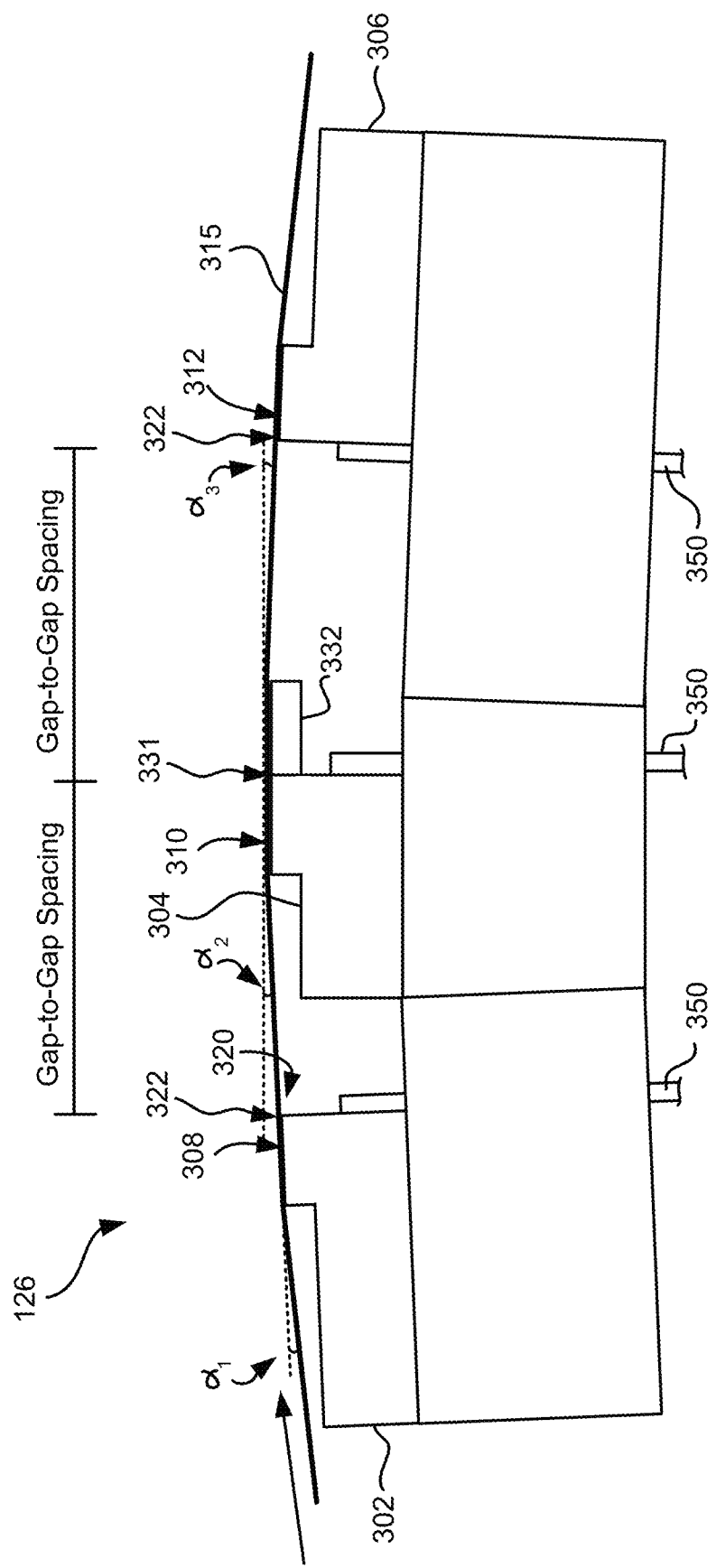
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
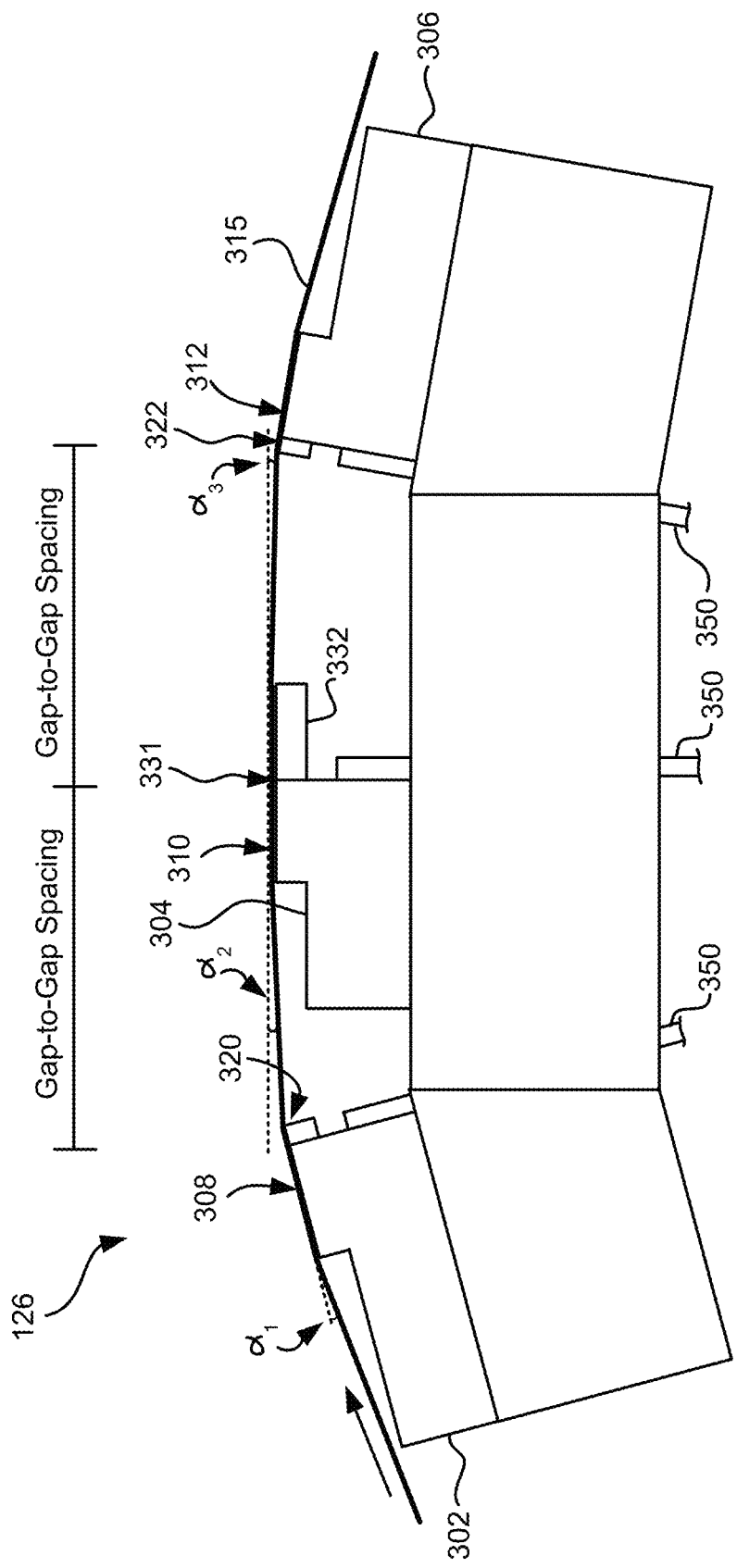
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
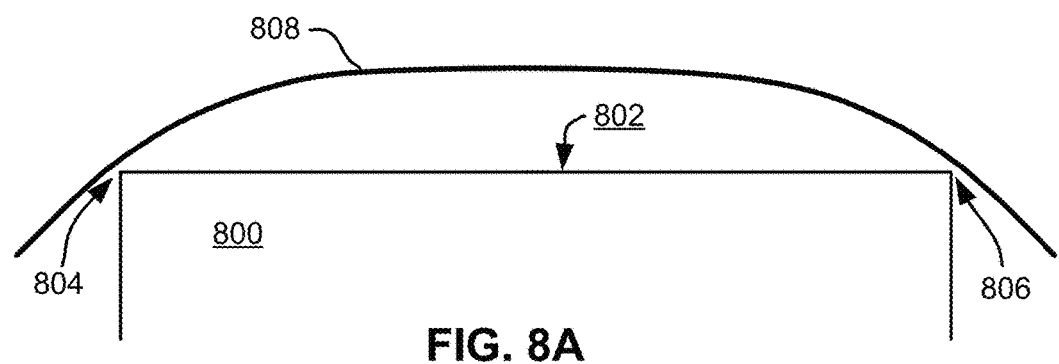
FIGS. 8A-8C are schematics depicting the principles of tape tenting.
Figure 8B:
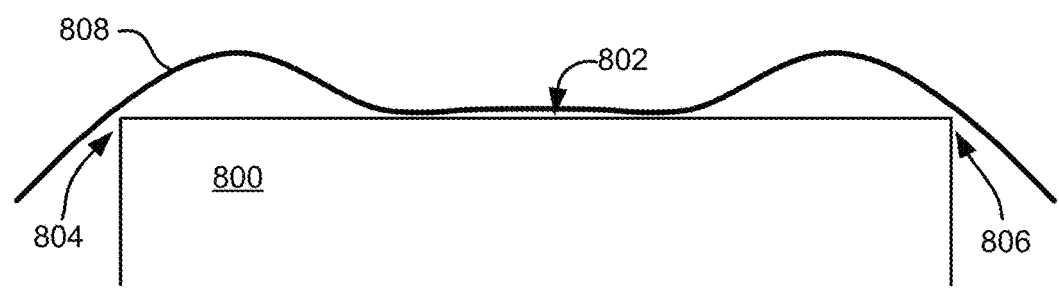
Figure 8C:
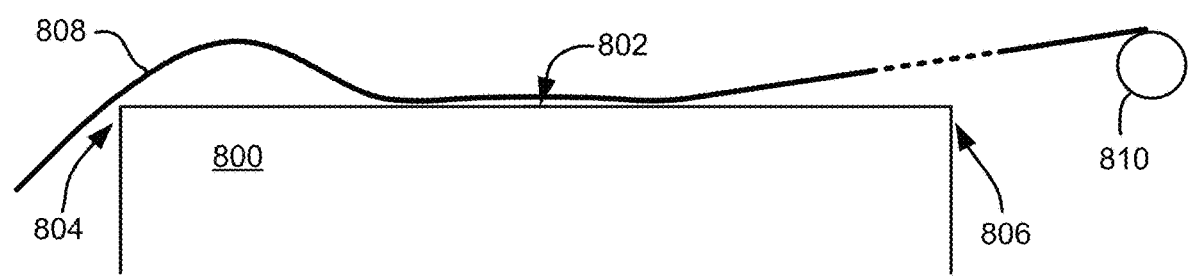

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
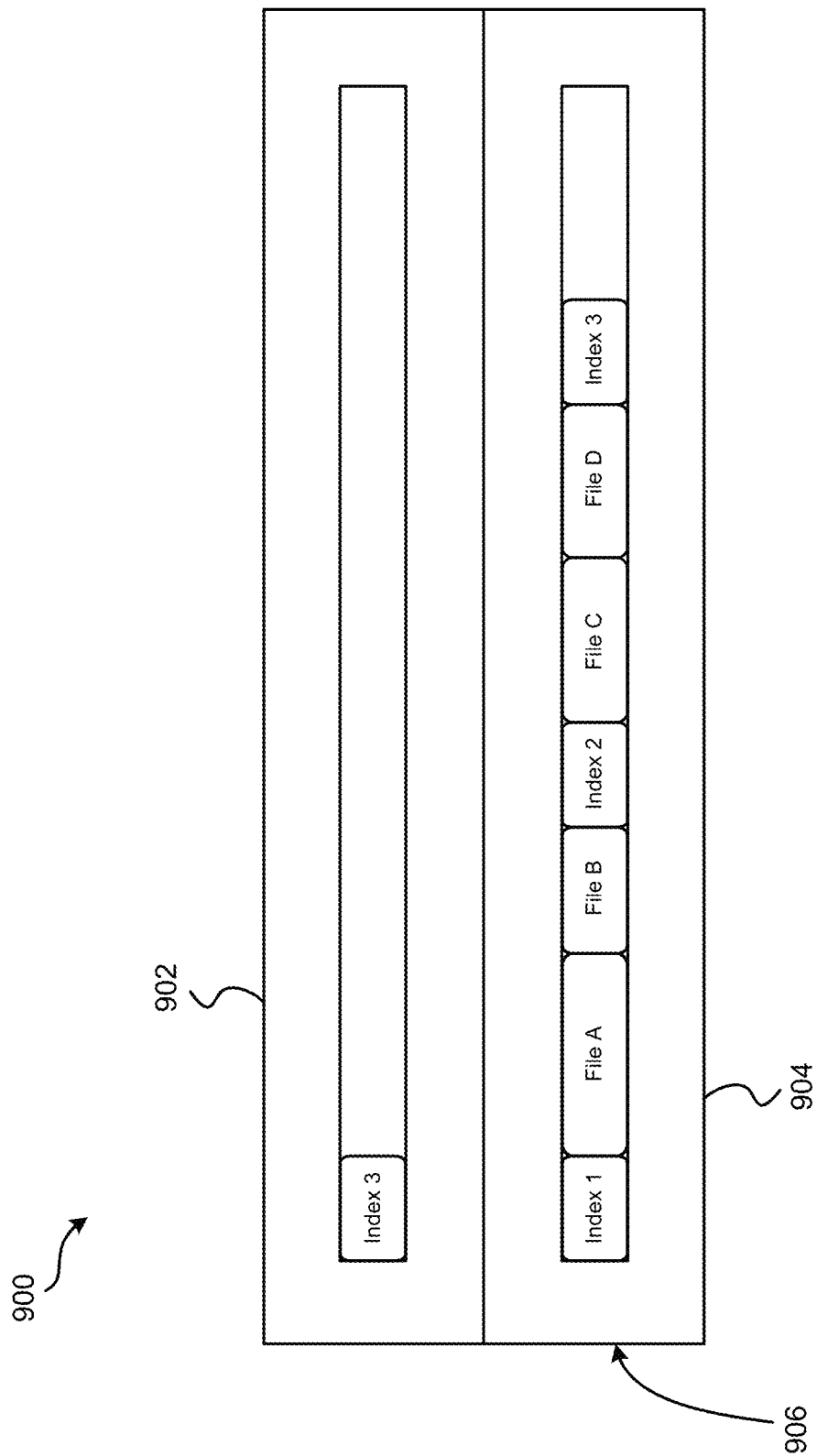
FIG. 9 is a representational diagram of files and indexes stored on a magnetic tape.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, efforts to achieve higher storage capacities include increasing track density, e.g., by writing narrower tracks. However, with higher track densities come more sensitivity to PES abnormalities.

One source of PES-related problems in tape drive environments is disturbances originating from the reels and/or motors. These disturbances can originate from events including (but not limited to) run-out, impacts of the tape and the reel flanges, electromechanical disturbances from the commutation of the reel motor itself, etc. One strategy that has been undertaken in an attempt to mitigate the negative effects associated with these disturbances includes designing a variable frequency notch filter that can track the time-varying frequency of a reel motor. For example, designing such a filter may include encoding a program for reducing amplification of frequencies that are determined to cause high amounts of PES, e.g., such as the PES spikes illustrated in FIG. 10, discussed in more detail below. However, such filters are prone to creating problematic amounts of PES in other frequencies of the motor(s). Accordingly, an attempt to fix one problem creates other problematic frequencies as a result, e.g., due to Bode's integral theorem.

With continued reference to frequencies of reel motors, it is important to note that the speed of each motor of a pair of reel motors changes independently as a function of how much tape is wound on a hub of an associated reel that is coupled to the reel motor. For example, to maintain a constant tape speed across a tape head, a motor driving a reel hub having a relatively lesser amount of tape wound thereon (and thus a relatively smaller radial diameter of wound tape)

rotates at a faster rate than a motor driving the other reel hub having a relatively greater amount of tape wound thereon. Of course, the rotation rates of such motors will change as the amount of tape wound on the hub of the respective reel changes for a given tape speed across the tape head.

As will be described in more detail below, motors tend to undesirably translate disturbances, e.g., vibrational forces, rotational forces, etc., to the recording tape when crossing various natural frequencies, where such disturbances in turn generate PES anomalies. For example, assume that a rotational frequency of a motor slows over 100 seconds to maintain a constant linear tape speed. At some rotational frequencies of the motor during the slowing thereof, motor-induced motion may be translated to the reel upon which the tape is wound, e.g., along an axis of rotation of the reel. This motor-induced motion moves the reel along its axis of rotation, which motion is in turn translated to the tape, resulting in a rapid lateral shift of the tape and a resulting substantial increase in detected PES, e.g., as increased PES observed by a servo-based track following system, which may operate in a conventional manner in any embodiment presented herein.

Figure 10:
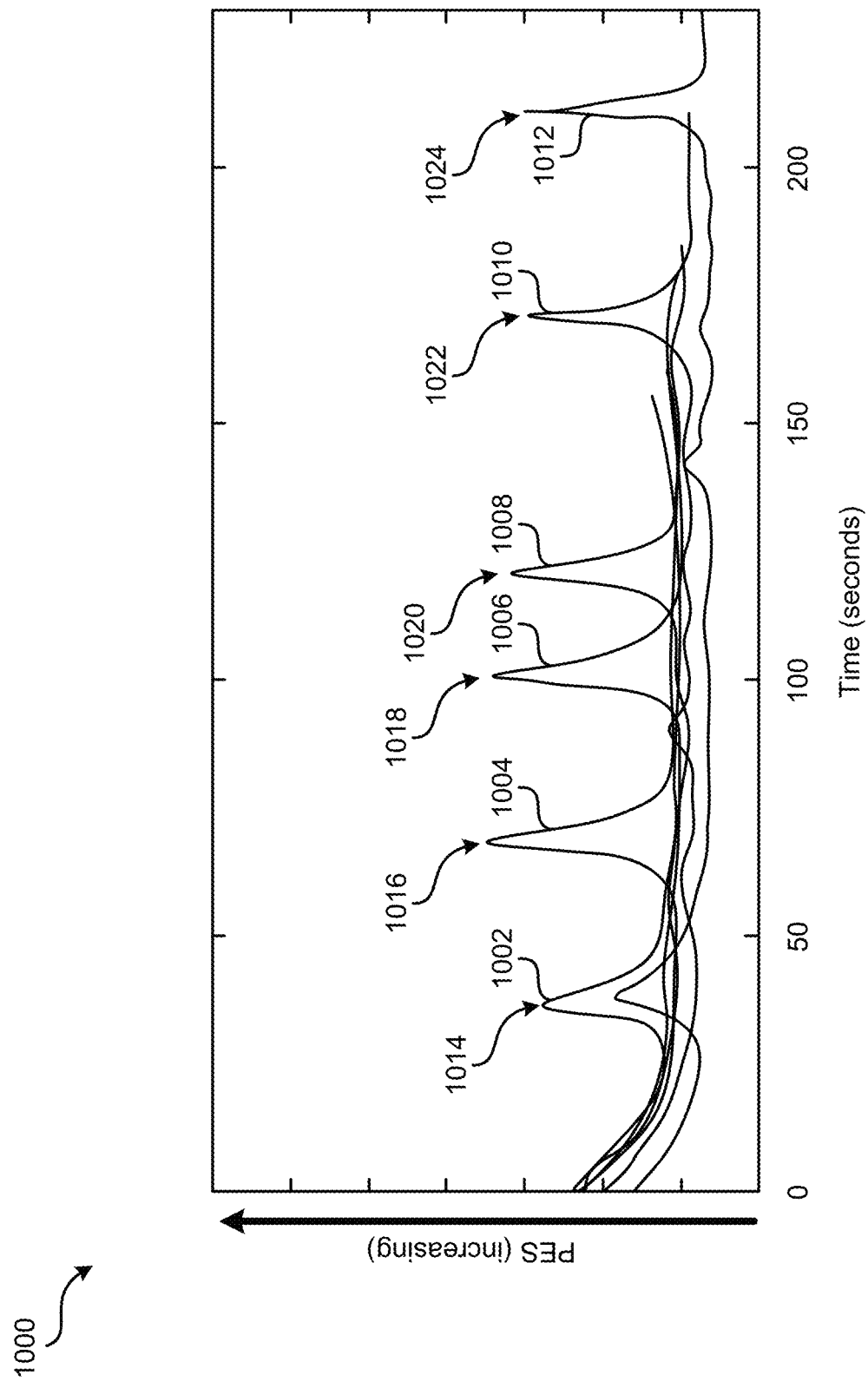
FIG. 10 is a graph comparing PES levels recorded over time at different reel motor speeds.

FIG. 10 includes a graph 1000 that illustrates standard deviation PES that results from disturbances that occur across different rotational speeds of a surveyed tape reel motor while the positioning system of the tape drive attempts to maintain a constant position of the head relative to tape. For example, graph 1000 includes six different lines 1002, 1004, 1006, 1008, 1010, 1012 which each represent the PES generated by a servo-based track following system at different respective constant linear recording tape velocities, e.g., the speed at which the recording tape is traversed across a tape head. Over time (x-axis), as the amount of tape that is wrapped on the reel coupled to the motor increases and/or decreases, the rotational speed of the surveyed motor decreases and/or increases (respectively) to maintain the constant recording tape speed. While the PES value (y-axis) should remain about constant as the rotational frequency changes, increases in PES at 1014, 1016, 1018, 1020, 1022, 1024 are observed at particular frequencies occurring at corresponding times shown as the rotational frequency of the motor changes. While not wishing to be bound by any theory, it is believed that the PES spikes result from the surveyed motor applying motor-induced motion to the reel upon reaching one or more particularly problematic natural frequencies. The motor-induced motion applied to the reel is translated to the recording tape, thereby causing a spike in the observed PES as the motion translated to the tape reaches the tape head.

By analyzing the varying motor speeds in the frequency domain, one or more particular frequencies associated with the PES spikes 1014, 1016, 1018, 1020, 1022, 1024 may be discoverable. However, discovering such frequencies will not necessarily lead to mitigation of PES spikes 1014, 1016, 1018, 1020, 1022, 1024. This is because the motors may have to operate at such frequencies, at least momentarily, during normal operation.

The underlying tape motion corresponding to the PES spikes tends to result in undesirable operational errors, e.g., overwriting of data tracks due to head-track misregistration, read errors due to head-track misregistration, wear to tape cartridge components (such as the reel), diminished track following accuracies, etc.

In sharp contrast, various embodiments and/or approaches described herein desirably reduce or eliminate PES anomaly-causing events experienced by tape environment components, by implementing a damping layer. The damping layer, which in some approaches includes at least one viscoelastic material, dampens motor-induced motion of the reel along an axis of rotation of the reel. As a result, various embodiments and/or approaches described herein desirably mitigate the aforementioned operational errors, as will be described in further detail below.

Figure 11A:
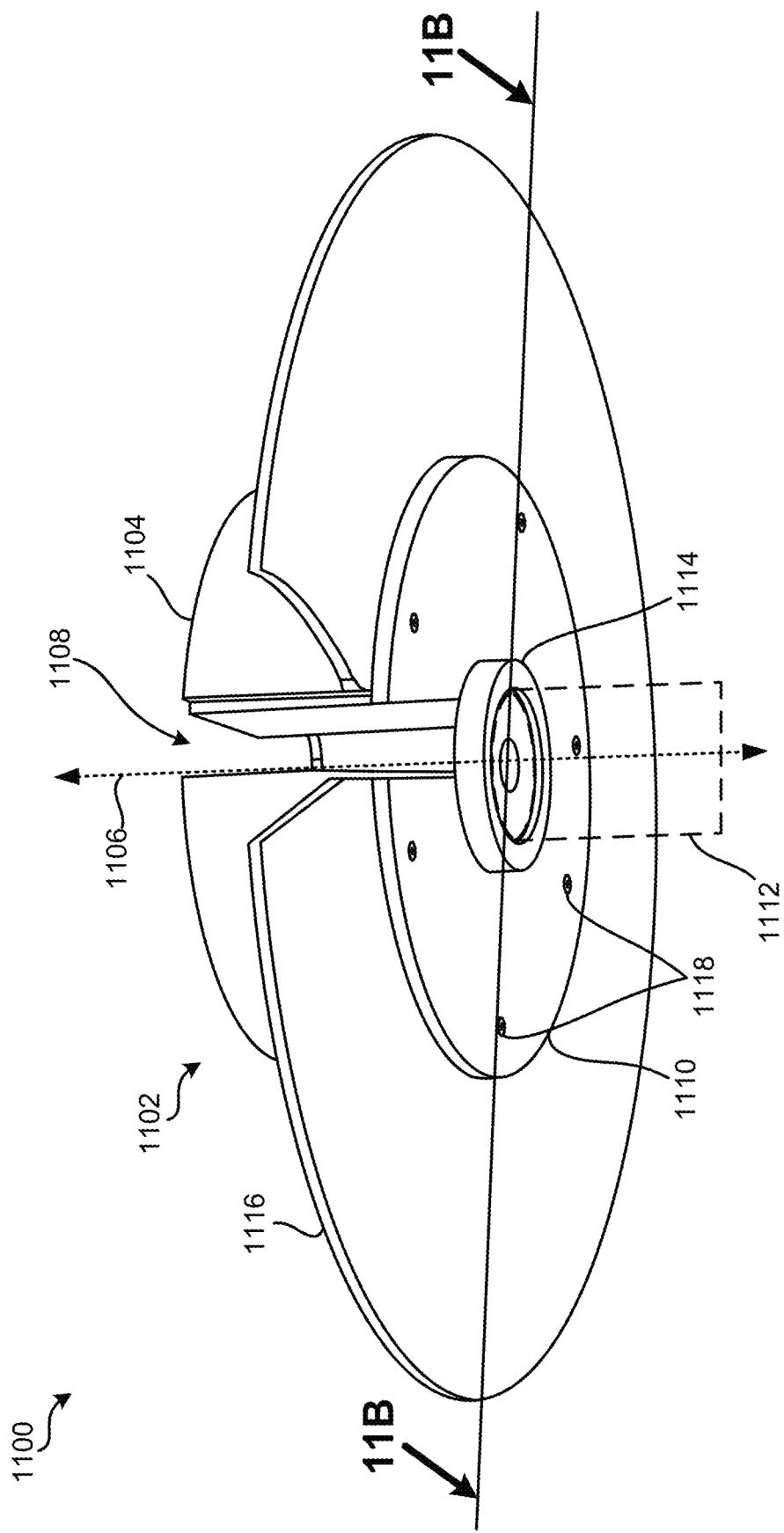
FIG. 11A is a perspective view of an apparatus having a reel and a damping layer coupled to the reel.

FIGS. 11A-11B depict an apparatus 1100, in accordance with one embodiment. As an option, the present apparatus 1100 may be implemented in conjunction with features from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment.

Apparatus 1100 includes a reel 1102 having a hub 1104. According to various approaches, the reel 1102 may be any type of reel, and may be of conventional design and/or construction. In the depicted approach, the reel 1102 is configured to serve as a take-up reel of a tape drive. Accordingly, the reel 1102 includes a void 1108 that is configured to accept and at least temporarily retain a leader pin coupled to an initial portion of tape, e.g., see FIG. 1B. Note that in other approaches, the apparatus 1100 may additionally and/or alternatively include a supply reel, e.g., see FIGS. 12A-12B.

The hub 1104 may include any one or more materials, e.g., rigid plastic, metal, paper, etc.

In one approach, apparatus 1100 includes a magnetic recording tape wound around the hub 1104. Note that in the present approach, tape is not shown wound around the hub 1104 for simplified viewing purposes.

The apparatus further includes a damping layer 1110 coupled to the reel 1102 for reducing translation of motion from a motor 1112 to the reel 1102 along the axis of rotation 1106 of the reel 1102. (Note that the rotating portion of the motor 1112 is represented by a dashed contour in the present approach to provide unobstructed viewing of the reel 1102.) For example, assume that the apparatus 1100 includes magnetic recording tape wound around the hub 1104, and assume that the apparatus 1100 is loaded within a tape drive. The magnetic recording tape may be unwound from and/or wound onto the hub 1104 (depending on an intended direction of travel of the magnetic recording tape) by rotation of the reel 1102, e.g., via rotation of the motor 1112 about the axis of rotation 1106 of the reel 1102.

According to various approaches, the damping layer 1110 may be coupled to the reel 1102 at any one or more locations of the reel 1102, using any one or more coupling types, in a manner that enables the motor to rotate the reel 1102 but reduces translation of motor-induced disturbances from the motor to the reel along the axis of rotation 1106 of the reel 1102. For example, in one approach, the reel 1102 is coupled to a portion of a flange 1116 of the reel 1102, e.g., see FIGS. 11A-11B. In another approach, the reel 1102 is additionally and/or alternatively coupled to a hub 1104 of the reel 1102.

Referring now to the coupling of the damping layer 1110 to the reel 1102, in some approaches, the damping layer 1110 is coupled to the reel 1102 using any one or more of, e.g., a threaded fastener 1118, welding, soldering, etc. In some other approaches, the damping layer 1110 is coupled to the reel 1102 using any one or more of, e.g., a known adhesive, press fit coupling, mating portions, etc.

While not present in all approaches, apparatus 1100 includes an insert 1114 between the motor 1112 and the damping layer 1110. The insert 1114 may include any one or more types of material, e.g., brass, plastic, aluminum, etc. In various approaches, the motor 1112 may be coupled to the insert 1114, e.g., via known adhesives, soldering, welding, threaded fasteners, etc. In contrast, in some other approaches, the motor 1112 may be selectively coupled to the insert 1114, e.g., via a press fit coupling.

In one alternate approach, apparatus 1100 does not include the insert 1114. Accordingly, in such an approach, the motor 1112 is coupled to the damping layer 1110, e.g., via known adhesives, soldering, welding, etc. A similar approach may be described in further detail elsewhere herein, e.g., see FIG. 12A-12B.

With continued reference to FIGS. 11A-11B, as will now be described, the damping layer 1110 is physically configured to dampen motor-induced motion of the reel 1102 along an axis of rotation 1106 of the reel 1102. Specifically, as will be described in greater detail below, and as will be understood by one of ordinary skill in the art upon reading various descriptions herein, as a result of the damping layer 1110 dampening motor-induced motion of the reel 1102 along an axis of rotation 1106 of the reel 1102, disturbances that result in problematic levels of PES (such as the PES spikes 1014-1024 in FIG. 10) that otherwise may have occurred without the damping layer 1110 present, are mitigated.

Referring to FIG. 11B, motor-induced disturbances along the axis of rotation 1106 of the reel 1102 are damped in some approaches by virtue of converting kinetic energy to heat, thereby dissipating aberrations from the motor. In other approaches, the damping layer 1110 is slightly resiliently deformable, whereby the center of the damping layer 1110 may move up and down along the axis of rotation 1106, while the outer end of the damping layer 1110 remains in a relatively more stable vertical position. Because the outer end of the damping layer 1110 is more stable than the center, motor-induced disturbances along the axis of rotation 1106 are more slowly applied to the reel 1102 (much like a shock absorber operates in principle on an automobile). In further approaches, a combination of converting kinetic energy to heat along with a resiliently deformable nature of the damping layer 1110 provides the desired damping effect.

It should be noted that the damping layer 1110 does not necessarily suppress motion of the motor 1112 itself, but does restrict and/or eliminate motor-induced motion from the motor 1112 from being transferred along the axis of rotation 1106 to the reel 1102. This is not the case in conventional recording tape drives, in which motors are rigidly connected to tape reels via a rigid connection (typically as a single piece of unforgiving rigid plastic).

As a result, the provided dampening also mitigates disturbances that would otherwise be measured as a higher PES by an associated write/read head and track following system of the apparatus 1100. This reduces the amount of motor-induced PES variation within a tape storage system that is utilizing and/or incorporates apparatus 1100, and thereby enables a relatively higher track density than would otherwise be available without such a damping layer 1110.

It should be noted that the dampening of motor-induced motion of the reel 1102 along the axis of rotation 1106 of the reel 1102 is not otherwise provided by conventional techniques such as variable frequency notch filters, which do not physically dampen motor-induced disturbances and particularly motor-induced disturbances that contribute to PES spikes. Instead, as previously mentioned, such conventional techniques such as variable frequency notch filters are known to create problematic amounts of PES in various other frequencies of the motor(s).

With reference now to the zoomed portion 1120 of the damping layer 1110 in FIG. 11A, in the current approach, the damping layer 1110 includes a laminate having a first metal layer 1122 and a viscoelastic layer 1124 extending along the first metal layer 1122. According to various approaches, the damping layer 1110 additionally and/or alternatively includes a second metal layer 1126 positioned to sandwich the viscoelastic layer 1124 between the first and second metal layers 1122, 1126.

In one approach, the sandwiching of the viscoelastic layer 1124 may enclose the viscoelastic layer 1124 within the metal layers 1122, 1126, e.g., the first metal layer 1122 and/or the second metal layer 1126 conceal the viscoelastic layer 1124 therebetween. In other approaches, the sandwiching of the viscoelastic layer 1124 leaves at least a portion of the viscoelastic layer 1124 visible.

The damping layer preferably decouples a source of disturbance from the reel 1102 and/or a recording tape associated with the reel 1102. In other words, in various approaches, the damping layer 1110 preferably absorbs and thereby mitigates forces from reaching portions of the apparatus 1100 that would otherwise result in PES. For example, it should be noted that in the present approach, the damping layer 1110 exists between the reel 1102 and the motor 1112. Accordingly, motor-induced motion of the reel 1102 along the axis of rotation 1106 of the reel 1102 is dampened and therefore not transmitted to the reel 1102. However, rotational motion about the axis of rotation 1106 of the reel 1102 is provided by the motor.

In preferred approaches, the viscoelastic layer 1124 includes a material that is operative to dissipate energy by converting kinetic energy into heat. Thus, vibrations and other aberrations from the motor are essentially absorbed by the damping layer 1110 rather than being translated to the reel 1102 and consequently to the tape. Accordingly, the impact of motor-induced disturbances on PES is significantly decreased.

According to various approaches, the viscoelastic layer 1124 may include any one or more materials that are known to dampen energy, such as by absorbing energy and converting absorbed energy into microscopic amounts of heat, e.g., known viscoelastic adhesives, neoprene, rubber, known damping foam(s), etc. In other approaches, the viscoelastic layer 1124 includes an elastomer, such as Sorbothane® sold by Sorbothane, Incorporated (having an office at 2144 State Route 59 Kent, Ohio 44240), Implus sold by Implus Footcare LLC (having an office at 2001 T W Alexander Drive Durham, N.C. 27709), and Noene® sold by Noene USA, LLC (which may be purchased online at http://www.noene-usa.com/shop/). Moreover, the metal layers 1122, 1126 may include any one or more types of metal material. Of course, in some approaches, the metal layers 1122, 1126 may include the same metal materials, while in other approaches, the metal layers may each be of a different metal material. Non-limiting examples of such metal materials includes any one or more of, e.g., aluminum, steel, brass, etc. It should be noted that the metal material(s) are preferably are rigid enough to prevent the damping layer 1110 from non-resiliently deforming, e.g., bending, twisting, denting, etc., during use of the apparatus 1100.

It should be noted that despite the rigidity of the metal layers 1122, 1126, the viscoelastic layer 1124 mitigates motion of the motor 1112 along the axis of rotation 1106 of the reel 1102 from being transferred to the reel 1102. Accordingly, in some approaches, the damping layer 1110 is somewhat resiliently deformable along the axis of rotation 1106 of the reel 1102.

The metal layers 1122, 1126 and the viscoelastic layer 1124 may include any functional range of dimensions. In preferred approaches, dimensions of the metal layers 1122, 1126 and the viscoelastic layer 1124 are configured to promote dampening of motor-induced motion of the reel 1102 along the axis of rotation 1106 of the reel 1102. Various potential ranges for such dimensions according to some approaches will now be discussed.

Referring first to the first metal layer 1122, in one approach, the first metal layer 1122 has a thickness 1128 in a range of about 0.25-1.75 millimeters (mm). Similarly, the second metal layer 1126, in one approach, has a thickness 1130 in a range of about 0.25-1.75 mm. It should be noted that the thickness 1128 of the first metal layer 1122 and the thickness 1130 of the second metal layer 1126 may be the same or different depending on the approach.

Referring now to the viscoelastic layer 1124, a range of a thickness 1132 of the viscoelastic layer 1124 according to one approach includes about 20-80 microns. In a preferred approach, a range of the thickness 1132 of the viscoelastic layer 1124 includes 45-55 microns.

Moreover, in various approaches, the damping layer 1110 preferably has an overall thickness 1136 in a range of 0.52-3.58 mm, depending on the approach.

Moreover, according to various approaches, the damping layer 1110 has a diameter 1138 in a range of 10-70 mm. In preferred approaches, the diameter 1138 of the damping layer 1110 is in a range of 30-50 mm.

Of course, the thicknesses of the metal layers 1122, 1126 and the viscoelastic layer 1124 may be different than stated herein in different approaches. For example, although in the present approach, the viscoelastic layer 1124 is illustrated and described to have a relatively lesser thickness 1132 than the thicknesses 1128, 1130 of each of the metal layers 1122, 1126 (respectively), in some approaches, the thickness 1132 of the viscoelastic layer 1124 is greater than one or more of the thickness 1128, 1130 of the metal layers 1122, 1126.

It should be noted that although in FIG. 11B a dimension 1134 along a longitudinal surface of the damping layer 1110 is shown to not extend to an outmost extent of the flange 1116, the dimension 1134 of the damping layer 1110 may be greater than or less than the extent of the flange 1116, depending on the approach. According to various approaches, the dimension 1134 of the damping layer 1110 is in a range that includes 10 mm-45 mm.

In some approaches, apparatus 1100 includes a magnetic head, and a controller electrically coupled to the magnetic head. Note that such components are not shown in FIGS. 11A-11B for simplified viewing purposes, although similar components are shown elsewhere herein, e.g., see controller 128 and magnetic head 126 of FIG. 1A. Referring again to apparatus 1100, in one approach, the motor 1112 is part of a drive mechanism for passing a magnetic medium over the magnetic head, e.g., for reading and/or writing.

In other approaches, apparatus 1100 includes a cartridge housing coupled to the reel 1102. Moreover, such an apparatus may include a tape such as a magnetic recording tape wound around the reel 1102.

It should be noted that although in the present approach, the damping layer 1110 includes a laminate having a first metal layer 1122 and a second metal layer 1126 sandwiching a viscoelastic layer 1124 there between, in some other approaches, the laminate may alternatively include only a single metal later and the viscoelastic layer 1124, e.g., see FIG. 12A. Moreover, the reel 1102 may be any type of reel. For example, although the reel in FIGS. 11A-11B is a take-up reel, in other approaches, the apparatus 1100 may additionally and/or alternatively include another type of reel, e.g., such as a supply reel, as will now be described (see FIGS. 12A-12B).

Figure 12A:
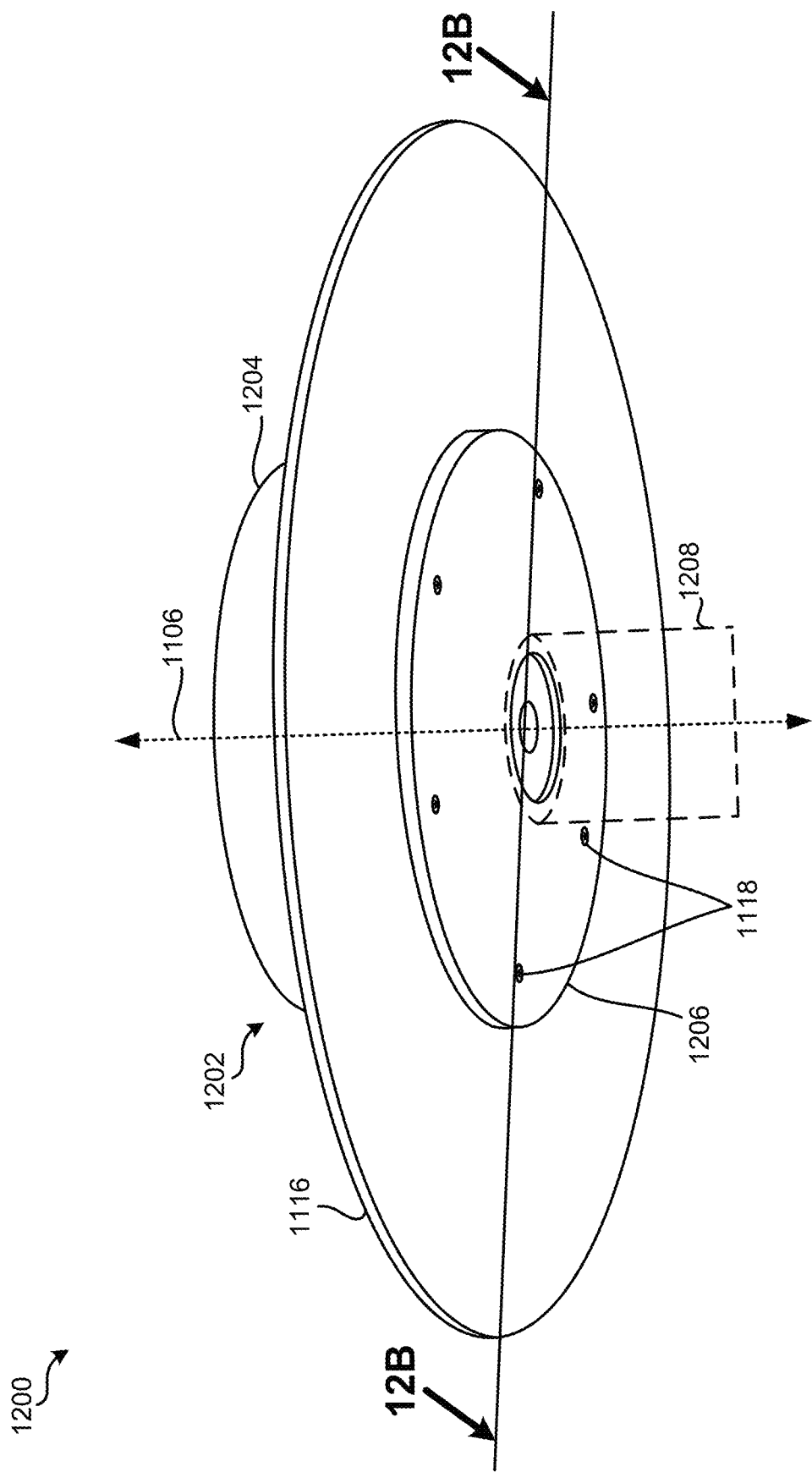
FIG. 12A is a perspective view of an apparatus having a reel and a damping layer coupled to the reel.
Figure 12B:
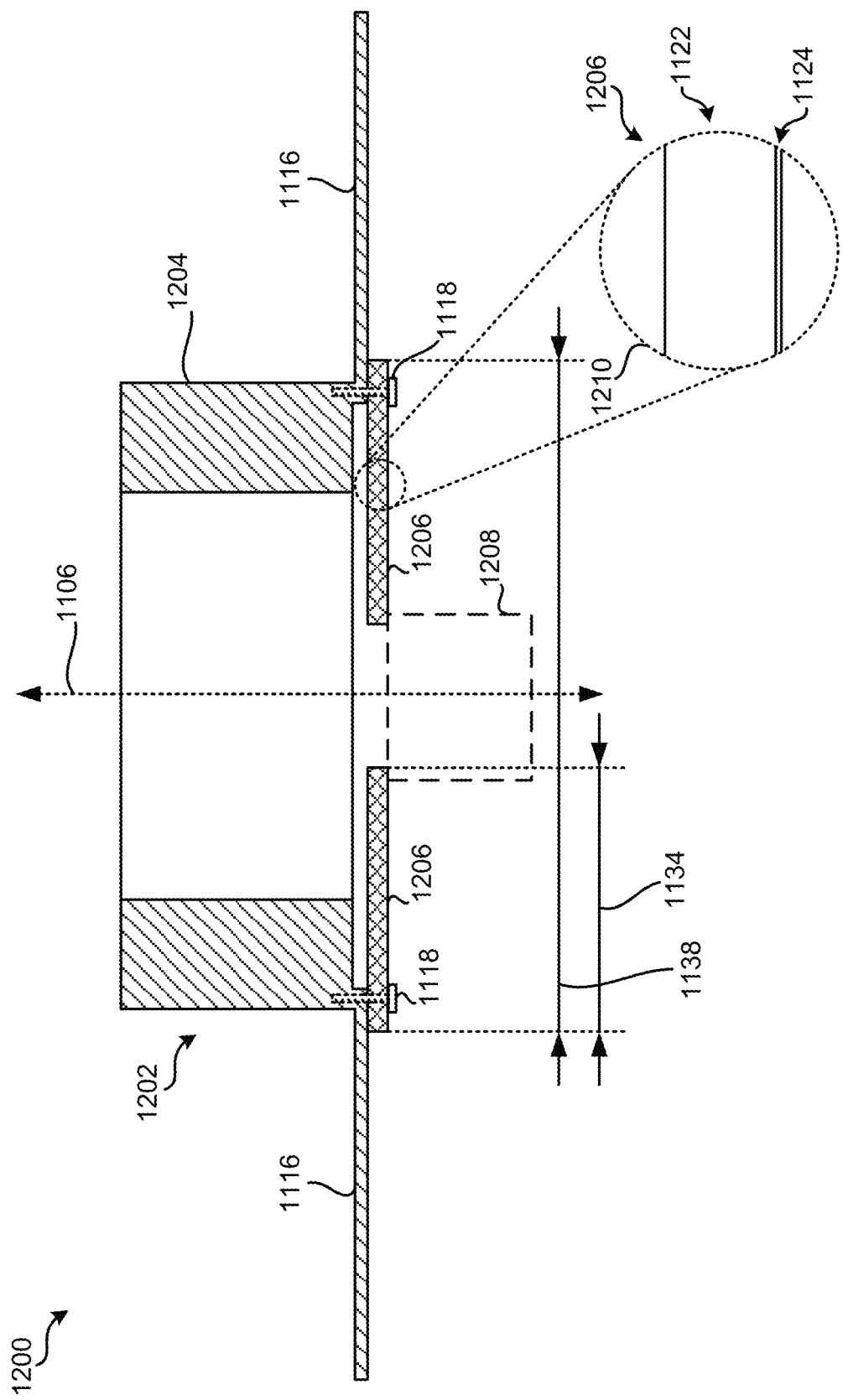
FIG. 12B is a cross sectional view of the apparatus of FIG. 12A taken along line 12B-12B.

FIGS. 12A-12B depict an apparatus 1200, in accordance with one embodiment. As an option, the present apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment.

Various portions of the apparatus 1200 may include common numbering with various similar portions of the apparatus 1100 of FIGS. 11A-11B. Such similar portions may have features and/or construction as those having common numbering in FIGS. 11A-11B.

With reference now to FIGS. 12A-12B, apparatus 1200 includes a reel 1202 having a hub 1204. According to various approaches, the reel 1202 may be any type of reel that is prone to experiencing PES and/or motor-induced motion along an axis of rotation 1106 of the reel 1202. For example, as illustrated in FIGS. 12A-12B, in one or more approaches, the reel 1202 is configured to serve as a cartridge reel, a supply reel of a tape drive, etc.

Moreover, the apparatus 1200 includes a damping layer 1206 coupled to the reel 1202 for translating rotational motion of a motor 1208 to the reel 1202 (the rotating portion of the motor 1208 is represented by a dashed contour in the present approach to provide unobstructed viewing of the reel 1202).

It should be noted that the location of the damping layer 1206 in other approaches may have a different location and/or configuration than shown. For example, in one approach, the damping layer 1206 may be additionally and/or alternatively integrated inside a clutch. In another approach, the damping layer 1206 may be additionally and/or alternatively integrated on an inner portion of the reel 1202. In another approach, the damping layer 1206 may be additionally and/or alternatively integrated on a deck portion of the reel 1202.

In the present approach, the motor 1208 engages the damping layer 1206, e.g., via known techniques. It should be noted that although the motor 1208 is shown engaging a portion of the damping layer 1206, in other approaches, an adapter or other interposer of known type may assist in engaging the motor 1208 with the damping layer 1206.

The damping layer may have a similar and/or identical construction, feature set and/or effect as the damping layer 1110 of FIGS. 11A-11B, but perhaps without the leader pin slot 1108.

With reference now to the zoomed portion 1210 of the damping layer 1206 in FIG. 12B, in the depicted approach, the damping layer 1206 includes a laminate having a first metal layer 1122 and a viscoelastic layer 1124 extending along the first metal layer 1122 for dampening motor-induced motion of the reel 1202 along the axis of rotation 1106 of the reel 1202. The first metal layer 1122 and viscoelastic layer 1124 may be similar to those described above with reference to FIGS. 11A-11B.

As a result of damping layers described herein damping motion of a motor that would otherwise be transferred to a reel, data reading and/or writing events will not experience error causing amounts of tape movement, e.g., as detected by PES spikes. Particularly, as illustrated in FIG. 13, PES spikes are mitigated as a result of implementing one or more of the apparatuses described herein.

Comparing graph 1300 of FIG. 13 (with damping as described herein) to the graph 1000 of FIG. 10 (without damping), a dramatic improvement in PES is observed as a result of the dampening described herein. For example, graph 1000 includes six different lines 1002, 1004, 1006, 1008, 1010, 1012 which each represent a different constant recording tape speed, e.g., the speed at which the recording tape is traversed across a tape head. The PES spikes correspond to one or more rotational frequencies that, for the motor and spool used, resulted in a motor-induced disturbance which appeared as a PES spike (as a result of the particular motor speed/frequency at that time). In sharp contrast, the PES spikes that were observed in the experiment corresponding to FIG. 10 were no longer observed in the experiment with damping as described herein (FIG. 13). For example, note that at locations 1302, 1304, 1306, 1308, 1310, 1312 of FIG. 13 (which in FIG. 10 included PES spikes), PES spikes are not observed. Recall that these PES spikes would otherwise likely result in undesirable operational errors, e.g., overwriting of data tracks, wear to tape cartridge components (such as the reel), diminished track following accuracies, etc. Accordingly, as a result of damping provided by apparatuses described in various approaches herein, e.g., see FIGS. 11A-12B, such operational errors are minimized and in most cases completely mitigated. Moreover, systems that implement such dampening also experience improved system performance and data accuracies.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a reel having a hub; and
a damping layer coupled to the reel, wherein the damping layer is physically configured such that all rotational motion that is applied to the reel from a motor is translated to the reel by the damping layer,
the damping layer being physically configured to dampen motor-induced motion of the reel along an axis of rotation of the reel.

2. An apparatus as recited in claim 1, comprising the motor coupled to the damping layer.

3. An apparatus as recited in claim 2, comprising an insert between the motor and the damping layer.

4. An apparatus as recited in claim 2, comprising a magnetic head; and a controller electrically coupled to the magnetic head, wherein the motor is part of a drive mechanism for passing a magnetic medium over the magnetic head.

5. An apparatus as recited in claim 1, wherein the reel is a take-up reel of a tape drive.

6. An apparatus as recited in claim 5, wherein the damping layer comprises a laminate having a first metal layer and a second metal layer sandwiching a viscoelastic layer therebetween.

7. An apparatus as recited in claim 1, comprising a cartridge housing coupled to the reel.

8. An apparatus as recited in claim 7, comprising a magnetic recording tape wound around the hub.

9. An apparatus as recited in claim 7, wherein the damping layer comprises a laminate having a first metal layer and a second metal layer sandwiching a viscoelastic layer therebetween.

10. An apparatus, comprising:
a reel having a hub; and
a damping layer coupled to the reel for translating motion of a motor to the reel, the damping layer being physically configured to dampen motor-induced motion of the reel along an axis of rotation of the reel,
wherein the damping layer comprises a laminate having a first metal layer and a viscoelastic layer extending along the first metal layer.

11. An apparatus as recited in claim 10, wherein the damping layer comprises a second metal layer positioned to sandwich the viscoelastic layer between the first and second metal layers.

12. An apparatus, comprising:
a reel having a hub; and
a damping layer coupled to the reel for translating motion of a motor to the reel,
the damping layer comprising a laminate having a first metal layer and a viscoelastic layer extending along the first metal layer for dampening motor-induced motion of the reel along an axis of rotation of the reel.

13. An apparatus as recited in claim 12, wherein the damping layer comprises a second metal layer positioned to sandwich the viscoelastic layer between the first and second metal layers.

14. An apparatus as recited in claim 12, comprising the motor coupled to the damping layer, wherein the reel is a take-up reel of a tape drive.

15. An apparatus as recited in claim 14, comprising an insert between the motor and the damping layer.

16. An apparatus as recited in claim 14, comprising a magnetic head; and a controller electrically coupled to the magnetic head, wherein the motor is part of a drive mechanism for passing a magnetic medium over the magnetic head.

17. An apparatus as recited in claim 14, wherein the damping layer comprises a second metal layer positioned to sandwich the viscoelastic layer between the first and second metal layers.

18. An apparatus as recited in claim 12, comprising a cartridge housing coupled to the reel.

19. An apparatus as recited in claim 18, comprising a magnetic recording tape wound around the hub.

20. An apparatus as recited in claim 18, wherein the damping layer comprises a second metal layer positioned to sandwich the viscoelastic layer between the first and second metal layers.

\* \* \* \* \*